(12) United States Patent
Obrecht et al.

(10) Patent No.: US 6,908,965 B2
(45) Date of Patent: Jun. 21, 2005

(54) GEL-CONTAINING RUBBER COMPOUNDS WITH MULTIFUNCTIONAL ISOCYANATES AND POLYOLS

(75) Inventors: Werner Obrecht, Moers (DE); Ludger Heiliger, Neustadt (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/013,025

(22) Filed: Dec. 7, 2001

(65) Prior Publication Data

US 2002/0177661 A1 Nov. 28, 2002

(30) Foreign Application Priority Data

Dec. 11, 2000 (DE) .......................... 100 61 543

(51) Int. Cl.$^7$ ............................... C08L 75/04
(52) U.S. Cl. ................... 525/125; 525/127; 525/131
(58) Field of Search ................ 525/125, 127, 525/131

(56) References Cited

U.S. PATENT DOCUMENTS

| | | | |
|---|---|---|---|
| 3,427,366 A | * 2/1969 | Verdol | 525/126 |
| 4,343,339 A | * 8/1982 | Schwindt | 152/209 |
| 5,124,408 A | 6/1992 | Engels et al. | 525/215 |
| 5,395,891 A | 3/1995 | Obrecht et al. | 525/194 |
| 6,127,488 A | 10/2000 | Obrecht et al. | 525/333.3 |
| 6,207,757 B1 | 3/2001 | Obrecht et al. | 525/194 |
| 2001/0006995 A1 | 7/2001 | Orbecht et al. | 525/125 |

FOREIGN PATENT DOCUMENTS

| | | |
|---|---|---|
| CA | 2316421 | 2/2001 |
| DE | 197 01 487 | 7/1998 |
| DE | 199 19 459 | 11/2000 |
| DE | 199 42620 | 3/2001 |
| EP | 1048692 | 11/2000 |
| WO | 93/03914 | 3/1993 |

* cited by examiner

*Primary Examiner*—Jeffrey B. Robertson
(74) *Attorney, Agent, or Firm*—Jennifer R. Seng

(57) ABSTRACT

The rubber compounds according to the present invention are based on uncrosslinked rubbers, crosslinked rubber particles together with multifunctional isocyanates and polyols. These rubber compounds can be used for the manufacture of rubber vulcanizates or any type of molded rubber article, whereby the vulcanizates display good mechanical properties combined with a large difference in impact resilience values at 70° C. and 23° C.

5 Claims, No Drawings

GEL-CONTAINING RUBBER COMPOUNDS WITH MULTIFUNCTIONAL ISOCYANATES AND POLYOLS

FIELD OF THE INVENTION

The present invention concerns rubber compounds based on uncrosslinked rubbers and crosslinked rubber particles (known as rubber gels or microgels) together with multifunctional isocyanates and polyols. The rubber compounds according to the present invention are suitable for the manufacture of rubber vulcanizates displaying both an advantageous combination of mechanical properties, such as moduli at 100% and 300% elongation and elongation at break, and a large difference in resilience values at 70° C. and 23° C. Furthermore, the vulcanizates produced from the rubber compounds according to the present invention possess a low density, which has an advantageous influence on the weight of molded rubber articles produced from the vulcanizates, especially tires and tire components.

BACKGROUND OF THE INVENTION

It is known that conventional fillers in rubber compounds, such as carbon black or silica, can be replaced quantitatively or partially by rubber gels. By virtue of the low density of the rubber gels, the corresponding vulcanizates exhibit a lower weight. In addition, the use of polybutadiene-based rubber gels (BR gels) produces high impact resilience values both at room temperature and at 70° C. Such vulcanizates can be used for the production of low-damping rubber articles, especially low-damping tire components. The use of SBR-based rubber gels produces low impact resilience values at room temperature and high impact resilience values at 70° C. Corresponding vulcanizates are suitable for tire treads, for example, with an advantageous relation between wet slip behavior and rolling resistance.

Reference is made in this connection by way of example to U.S. Pat. No. 5,124,408, U.S. Pat. No. 5,395,891, DE-A 197 01 488.7, DE-A 197 01 487.9, DE-A 199 29 347.3, DE-A 199 39 865.8, DE-A 199 42 620.1.

The reinforcing effect of these rubber gels is not adequate for industrial use in vulcanizates, the term reinforcing effect referring here to the product $S_{300} \times D$, i.e. the product of the modulus at 300% elongation ($S_{300}$) and elongation at break (D). The reinforcing effect of the rubber gels is improved by additions of suitable additives, e.g. of sulfur-containing organosilicon compounds (DE-A 19 929 347), of capped bismercaptans (DE-A 19 942 620) or of multifunctional isocyanates (DE-A 19 962 862). The disadvantage in the use of these additives, particularly in the use of multifunctional isocyanates, is that the improvement in the reinforcing effect $S_{300} \times D$ is associated with a deterioration in the difference in impact resilience values at 70° C. and 23° C. ($E_{70} - E_{23}$).

Many areas of application of vulcanized rubber articles require both a high level of mechanical properties, especially for the product $S_{300} \times D$, and a high difference in resilience ($E_{70} - E_{23}$).

Therefore, there was a technical need to find measures allowing both a high level of mechanical values for $S_{300} \times D$ and high differences in impact resilience values at 70° C. and 23° C. ($E_{70} - E_{23}$) in gel-filled rubber vulcanizates.

SUMMARY OF THE INVENTION

It was found that this object is achieved in rubber compounds containing rubber gels and additions of multifunctional isocyanates by the addition of polyols.

Therefore, the present invention provides rubber compounds containing uncrosslinked rubbers (A), crosslinked rubber particles (B), multifunctional isocyanates (C) and polyols (D), whereby in the compound, relative in each case to 100 parts by weight (phr) of the rubber component (A), the content of component (B) is 1 to 150 parts by weight, the content of multifunctional isocyanates (C) is 1 to 100, and the content of polyols (D) is 1 to 50.

DETAILED DESCRIPTION OF THE INVENTION

The present invention relates to rubber compounds containing uncrosslinked rubbers (A), crosslinked rubber particles (B), multifunctional isocyanates (C) and polyols (D), whereby in the compound, relative in each case to 100 parts by weight (phr) of the rubber component (A), the content of component (B) is 1 to 150 parts by weight, preferably 5 to 100 parts by weight, the content of multifunctional isocyanates (C) is 1 to 100, preferably 3 to 50 parts by weight, and the content of polyols (D) is 1 to 50, preferably 1 to 30 parts by weight.

Uncrosslinked rubbers (A) are understood to be rubbers designated as R rubbers according to DIN/ISO 1629. These rubbers have a double bond in the main chain. They include, for example:

| | |
|---|---|
| NR: | Natural rubber |
| IR: | Polyisoprene |
| IS: | Isoprene-styrene copolymers |
| SBR: | Styrene-butadiene rubber |
| BR: | Polybutadiene rubber |
| NBR: | Nitrile rubber |
| IIR: | Butyl rubber |
| BIIR: | Brominated isobutylene-isoprene copolymers with bromine contents of 0.1 to 10 wt. % |
| CIIR: | Chlorinated isobutylene-isoprene copolymers with bromine contents of 0.1 to 10 wt. % |
| HNBR: | Hydrogenated or partially hydrogenated nitrile rubber |
| SNBR: | Styrene-butadiene-acrylonitrile rubber |
| SIBR: | Styrene-butadiene-isoprene rubber |
| CR: | Polychloroprene |
| ENR: | Epoxidized natural rubber or mixtures thereof |
| X-NBR: | Carboxylated nitrile rubbers |
| X-SBR: | Carboxylated styrene-butadiene copolymers. |

Rubbers designated as M, O, Q and U rubbers according to DIN/ISO 1629 can also be used, however. They include, for example:

| | |
|---|---|
| EAM: | Ethylene-acrylate copolymers |
| EVM: | Ethylene-vinyl acetate copolymers |
| CO and ECO: | Epichlorohydrin rubbers |
| Q: | Silicone rubbers |
| AU: | Polyester urethane polymers |
| EU: | Polyether urethane polymers. |

The rubbers of the above type for use in the rubber compounds according to the present invention can naturally be modified by functional groups that are capable of reacting with the functional isocyanates to be used and can improve coupling of the crosslinked rubber particles to the surrounding rubber matrix in the vulcanized state.

In particular, uncrosslinked rubbers that are functionalized by hydroxyl, carboxyl, amino and/or amide groups are particularly preferred. Functional groups can be introduced directly during polymerization by means of copolymerization with suitable comonomers or after polymerization by means of polymer modification.

The quantity of functional groups in the rubbers is conventionally 0.05 to 25 wt. %, preferably 0.1 to 10 wt. %.

Crosslinked rubber particles (B), known as rubber gels, gels or microgels, used in the compounds according to the present invention are in particular, those obtained by corresponding crosslinking of the following rubbers:

| | |
|---|---|
| NR: | Natural rubber |
| BR: | Polybutadiene |
| ABR: | Butadiene-C$_{1-4}$ alkyl acrylate copolymers |
| IR: | Polyisoprene |
| SBR: | Styrene-butadiene copolymers with styrene contents of 1–60, preferably 5–50 wt. % |
| SNBR: | Styrene-acrylonitrile-butadiene polymers |
| X-SBR: | Carboxylated styrene-butadiene copolymers |
| FKM: | Fluororubber |
| ACM: | Acrylate rubber |
| NBR: | Polybutadiene-acrylonitrile copolymers with acrylonitrile contents of 5–60, preferably 10–50 wt. % |
| X-NBR: | Carboxylated nitrite rubbers |
| CR: | Polychloroprene |
| IIR: | Isobutylene-isoprene copolymers with isoprene contents of 0.5–10 wt. % |
| BIIR: | Brominated isobutylene-isoprene copolymers with bromine contents of 0.1 to 10 wt. % |
| CIIR: | Chlorinated isobutylene-isoprene copolymers with bromine contents of 0.1 to 10 wt. % |
| HNBR: | Partially and fully hydrogenated nitrite rubbers |
| EPDM: | Ethylene-propylene-diene copolymers |
| EAM: | Ethylene-acrylate copolymers |
| EVM: | Ethylene-vinyl acetate copolymers |
| CO and ECO: | Epichlorohydrin rubbers |
| Q: | Silicone rubbers |
| AU: | Polyester urethane polymers |
| EU: | Polyether urethane polymers. |

The rubber particles for use according to the present invention conventionally have particle diameters from 5 to 1000 nm, preferably 10 to 600 nm (diameters stated according to DIN 53 206). Their crosslinking makes them insoluble and swellable in suitable solvents, e.g. toluene. The swelling indices of the rubber particles (QI) in toluene are approx. 1 to 15, preferably 1 to 10. The swelling index is calculated from the weight of the solvent-containing gel (after centrifuging at 20,000 rpm) and the weight of the dry gel, whereby QI=wet weight of the gel/dry weight of the gel. The gel content of the rubber particles according to the present invention is conventionally 80 to 100 wt. %, preferably 90 to 100 wt. %.

Production of the crosslinked rubber particles to be used from the base rubbers of the previously mentioned type is known in principle and described for example in U.S. Pat. No. 5,395,891 and EP-A 981 000 49.0.

It is also possible to increase the particle sizes of the rubber particles by means of agglomeration. The production of silica/rubber hybrid gels by coagglomeration is also described for example in German patent application no. DE-A 199 39 865.8. Rubber particles of this type can also be used in the compounds according to the present invention.

Naturally, the crosslinked rubber particles, like the above-mentioned uncrosslinked rubbers, can likewise be modified by suitable functional groups, which—as mentioned previously—are capable of reacting with the multifunctional isocyanates to be used and/or improve the coupling of the rubber particles to the surrounding rubber matrix in the vulcanized state.

Preferred functional groups are again the hydroxyl, carboxyl, amino and/or amide groups. The amount of these functional groups corresponds to the amount of these groups in the uncrosslinked rubbers mentioned above.

Modification of the crosslinked rubber particles (rubber gels) and introduction of the previously mentioned functional groups is likewise known to the person skilled in the art and described for example in German patent application nos. 199 19 459.9, 199 29 347.3, 198 34 804.5.

Reference is made at this point only to the modification of the corresponding rubbers in aqueous dispersion with corresponding polar monomers, which are capable of introducing a hydroxyl, amino, amide and/or carboxyl group into the rubbers.

Modified, crosslinked rubber particles that are surface-modified by —OH; —COOH; —NH$_2$; —CONH$_2$; —CONHR groups and are in the above-mentioned quantity range are preferably used in the rubber compounds according to the present invention.

Suitable multifunctional isocyanates (component C) for the rubber compounds according to the present invention are isocyanates having two or more, preferably 2 to 10, isocyanate groups in the molecule. Examples include the known aliphatic, cycloaliphatic, aromatic, oligomeric and polymeric multifunctional isocyanates. A representative of the aliphatic multifunctional isocyanates is e.g. hexamethylene diisocyanate (HDI); a representative of the cycloaliphatic multifunctional isocyanates is e.g. 1-isocyanato-3-(isocyanatomethyl)-3,5,5-trimethylcyclohexane (isophorone diisocyanate/IPDI). Examples of representatives of the aromatic multifunctional isocyanates include 2,4- and 2,6-diisocyanatotoluene and the corresponding technical isomer blend (TDI); diphenylmethane diisocyanates, such as diphenylmethane-4,4'-diisocyanate, diphenylmethane-2,4'-diisocyanate, diphenylmethane-2,2'-diisocyanate and the corresponding technical isomer blends (MDI). Other examples include naphthalene-1,5-diisocyanate (NDI) and 4,4',4"-triisocyanatotriphenylmethane.

To lower the vapor pressure of the multifunctional isocyanates, it may be necessary to use the multifunctional isocyanates in their higher-molecular form. The most important methods of producing higher-molecular products are dimerization, as practiced in the case of dimerized 2,4-diisocyanatotoluene, for example, which is available commercially as Desmodur TT®, trimerization and polymerization.

To avoid the risk of a premature crosslinking reaction, e.g. during production of the compound (reducing the compound's susceptibility to scorching), it is advisable to block the isocyanate functions reversibly. In particular, the temperature-reversible blocking (capping) of isocyanate groups with special alcohols, phenols, caprolactams, oximes or known types of β-dicarbonyl compounds is of particular interest.

Examples of polyols (component D) for the rubber compounds according to the present invention include, in particular, polyester polyols, polyether polyols, polycarbonate polyols or mixtures thereof.

Suitable polyetherols can be prepared by reacting one or more alkylene oxides containing 2 to 4 carbon atoms in the alkylene radical with a starter molecule containing two active hydrogen atoms in bonded form. Examples of alkylene oxides include: ethylene oxide, 1,2-propylene oxide, epichlorohydrin and 1,2- and 2,3-butylene oxide. Ethylene oxide, propylene oxide and mixtures of 1,2-propylene oxide and ethylene oxide are preferably used. The alkylene oxides can be used alone, alternating in succession or as mixtures. Examples of starter molecules include: water, amino alcohols such as N-alkyl diethanolamines, for example N-methyl diethanolamine, and diols, such as ethylene glycol, 1,3-propanediol, 1,2-propanediol, 1,4-butanediol, 1,6-hexanediol, bisphenol A, resorcinol, catechol, trimethylol propane, glycerol, pentaerythritol, sorbitol, glucose, degraded starch, ethylene diamine and diaminotoluene.

Mixtures of starter molecules can optionally, also be used. Other suitable polyetherols are the hydroxyl group-containing polymerization products of tetrahydrofuran.

Trifunctional polyethers in quantities of 0 to 30 wt. %, relative to the bifunctional polyethers, can also be used.

The substantially linear polyetherols have molecular weights from 62 to 10,000, preferably 100 to 5000. They can be used both alone and in the form of mixtures with one another.

Suitable polyesterols can be prepared from, for example, dicarboxylic acids with 2 to 12 carbon atoms, preferably 4 to 6 carbon atoms, and polyhydric alcohols. Examples of dicarboxylic acids include aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used alone or as mixtures, e.g. in the form of a mixture of succinic, glutaric and adipic acids. In preparing the polyesterols it can optionally be advantageous to replace the dicarboxylic acids with the corresponding dicarboxylic acid derivatives, such as carboxylic acid diesters with 1 to 4 carbon atoms in the alcohol radical, carboxylic anhydrides or carboxylic acid chlorides. Examples of polyhydric alcohols include glycols with 2 to 10, preferably 2 to 6 carbon atoms, such as ethylene glycol, diethylene glycol, butanediol-1,4, pentanediol-1,5, hexanediol-1,6, decanediol-1,10, 2,2-dimethyl propanediol-1,3, propanediol-1,3 and dipropylene glycol. Depending on the desired properties, the polyhydric alcohols can be used alone or optionally as mixtures with one another.

Also suitable are esters of carbonic acid with the cited diols, particularly those having 4 to 6 carbon atoms, such as butanediol-1,4 and/or hexanediol-1,6, condensation products of ω-hydroxycarboxylic acids, for example ω-hydroxyhexanoic acid, and preferably polymerization products of lactones, for example optionally substituted ω-caprolactones.

Ethanediol polyadipates, 1,4-butanediol polyadipates, ethanediol-1,4-butanediol polyadipates, 1,6-hexanediol neopentyl glycol polyadipates, 1,6-hexanediol-1,4-butanediol polyadipates and polycaprolactones are preferably used as polyesterols.

The polyesterols display molecular weights of 180 to 10,000, preferably 200 to 5000.

The polycarbonate polyols to be used can be prepared by known means, for example by interesterification of the above diols with a carbonic acid diester, e.g. diphenyl carbonate. The molecular weights are around 180 to 10,000, preferably 200 to 5000.

The following polyols are to be cited by preference:

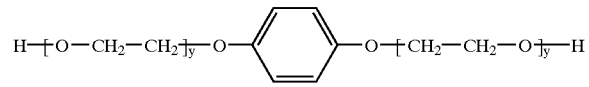

where
y=1 to 20,
(A corresponding product with y=1 is sold as Vernetzer 30/10 by Rheinchemie.)

and:

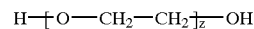

where
z=1 to 20.

Corresponding products with molecular weights of 285 to 315 g/mol and 380 to 420 g/mol are available e.g. as polyethylene glycol 300 and polyethylene glycol 400 from Merck in Darmstadt.

The rubber compounds according to the present invention can contain further known rubber auxiliary substances and fillers. Particularly suitable fillers for production of the rubber compounds according to the present invention are, for example:

Carbon blacks. The carbon blacks for use in this connection are produced by the lamp black, furnace black or channel black method and have BET surface areas of 20–200 m$^2$/g, such as e.g.: SAF, ISAF, IISAF, HAF, FEF or GPF carbon blacks.

Highly dispersed silica produced e.g. by precipitations of solutions of silicates or by flash hydrolysis of silicon halides, with specific surface areas of 5–1000, preferably 20–400 m$^2$/g (BET surface area) and primary particle sizes of 5–400 nm. The silicas can optionally also be present as mixed oxides with other metal oxides, such as Al, Mg, Ca, Ba, Zn and Ti oxides.

Synthetic silicates, such as aluminum silicate, alkaline-earth silicate, such as magnesium silicate or calcium silicate, with BET surface areas of 20–400 m$^2$/g and primary particle diameters of 5–400 nm.

Natural silicates, such as kaolin and other naturally occurring silicas.

Metal oxides, such as zinc oxide, calcium oxide, magnesium oxide, aluminum oxide.

Metal carbonates, such as calcium carbonate, magnesium carbonate, zinc carbonate.

Metal sulfates, such as calcium sulfate, barium sulfate.

Metal hydroxides, such as aluminum hydroxide and magnesium hydroxide.

Glass fibers and glass fiber products (strips, strands or glass microbeads).

Thermoplastic fibers (polyamide, polyester, aramide).

The fillers can be used in quantities of 0.1 to 100 parts by weight, relative to 100 parts by weight of the rubber component A.

The cited fillers can be used alone or in mixtures with one another.

Rubber compounds containing, in addition to the specified quantities of components A), B) and C), 10 to 100 parts by weight of crosslinked rubber particles (component B) and 0.1 to 100 parts by weight of carbon black and/or 0.1 to 100 parts by weight of so-called light-colored fillers of the above type, relative in each case to 100 parts by weight of rubber component A, are more preferred. Where a mixture of rubber gel, carbon black and light-colored fillers is used, the maximum quantity of fillers is approx. 150 parts by weight.

The rubber compounds according to the present invention can—as has been mentioned—contain further rubber auxiliary substances, such as crosslinking agents, vulcanization accelerators, antioxidants, heat stabilizers, light stabilizers, anti-ozonants, processing aids, plasticizers, tackifiers, blowing agents, dyestuffs, pigments, wax, extenders, organic acids, retarders, metal oxides, as well as filler activators, such as bis(triethoxysilylpropyl) tetrasulfide. The rubber auxiliary substances are described, for example, in J. van Alphen, W. J. K. Schönbau, M. van Tempel, Gummichemikalien, Berliner Union GmbH Stuttgart 1956 and in the Handbuch für die Gummiindustrie, Bayer AG, $2^{nd}$ edition, 1991.

The rubber auxiliary substances are used in conventional quantities, which are governed inter alia by the intended application. Conventional quantities are for example 0.1 to 50 parts by weight, relative to 100 parts by weight of rubber (A).

The rubber compounds according to the present invention can, moreover, also contain conventional crosslinking agents such as sulfur, sulfur donors, peroxides or other crosslinking agents, such as e.g. diisopropenyl benzene, divinyl benzene, divinyl ether, divinyl sulfone, diallyl phthalate, triallyl cyanurate, triallyl isocyanurate, 1,2-polybutadiene, N,N'-m-phenylene maleinimide and/or triallyl trimellitate. Other possibilities include the acrylates and methacrylates of polyhydric, preferably dihydric to tetrahydric $C_2$ to $C_{10}$ alcohols, such as ethylene glycol, propanediol-1,2-butanediol, hexanediol, polyethylene glycol with 2 to 20, preferably 2 to 8, oxyethylene units, neopentyl glycol, bisphenol A, glycerol, trimethylol propane, pentaerythritol, sorbitol with unsaturated polyesters of aliphatic diols and polyols together with maleic acid, fumaric acid and/or itaconic acid.

Sulfur and sulfur donors in the known quantities, for example, in quantities of 0.1 to 15, preferably 0.5 to 7, relative to 100 parts by weight of rubber component (A), are preferably used as crosslinking agents.

The rubber compounds according to the present invention can also contain vulcanization accelerators of the known type, such as mercaptobenzothiazoles, sulfenamides, guanidines, thiurams, dithiocarbamates, thio ureas, thiocarbonates and/or dithiophosphates. Like the crosslinking agents, the vulcanization accelerators are used in quantities of approx. 0.1 to 10 parts by weight, preferably 0.5 to 5 parts by weight, relative to 100 parts by weight of rubber component (A).

The rubber compounds according to the present invention can be prepared by known means, for example, by mixing the individual solid components in suitable equipment, such as rolls, internal mixers or compounding extruders. The individual components are conventionally mixed together at compounding temperatures of 20 to 100° C.

The rubber compounds according to the present invention can also be prepared by mixing together the two rubber components (A) and (B) in their latex form and then incorporating the other components into this latex blend and then working up the latex blend to the corresponding rubber compounds by conventional operations such as evaporation, precipitation or freeze coagulation.

The principal objective in preparing the rubber compound according to the present invention is to mix the compound components together thoroughly and to achieve a good dispersion of the fillers used in the rubber matrix.

The rubber compounds according to the present invention are suitable for the production of rubber vulcanizates by corresponding crosslinking reactions with the known crosslinking agents and are used to manufacture all types of molded articles, particularly to manufacture cable sheaths, tubes, drive belts, conveyor belts, roll coverings, tires and tire components, shoe soles, sealing rings, damping elements and membranes, preferably tires and tire components.

EXAMPLES

Gel (1):

Gel (1) is an SBR gel. It is used in the rubber compound according to the present invention in the form of a masterbatch with a content of 50 wt. % NR rubber.

Gel (1) is prepared by post-curing an SBR latex having a styrene content of 23 wt. % (Baystal BL 1357® from Bayer France, Port Jérôme) with 1.5 phr dicumyl peroxide. The crosslinking reaction and working up were performed in accordance with Example 1 of EP-A 0 854 170. Characteristic data for gel (1) is set out in the table below.

Gel (2):

Gel (2) is a hydroxyl-modified SBR gel. Starting from Baystal BL 1357, which has been crosslinked with 1.5 phr dicumyl peroxide, it is surface modified by grafting with hydroxyethyl methacrylate (HEMA). Surface modification with HEMA and coagulation of the SBR gel modified with HEMA are described below.

For modification with hydroxyethyl methacrylate, the SBR latex post-cured with 1.5 phr dicumyl peroxide was placed in a polymerization reactor and diluted with water so that the solids content was 20 wt. %. After addition of 3 phr 97% hydroxymethyl methacrylate relative to the latex solids content and addition of 0.12 phr 50% p-methane hydroperoxide, the reaction mixture was heated to 70° C. with stirring and then stirred for a further 1 hour at this temperature. 0.05 wt. %, relative to the latex solids content, of an aqueous 0.5 wt. % solution of the sodium salt of 1-hydroxymethane sulfinic acid dihydrate (Rongalit® from BASF) was then added within 1 hour. The pH value was kept constant, namely at pH 9, throughout the entire reaction by the addition of 1 N sodium hydroxide solution. After a reaction time of 1 hour at 70° C., the polymerization conversion for the latex was 90%. The density of the latex particles was 0.987 g/cm³. The particle diameters were: $d_{10}$=50 nm; $d_{50}$=57 nm; $d_{80}$=61 nm.

Before precipitating the hydroxyl-modified SBR microgel, the following antioxidants were also stirred into the latex in the specified quantities, relative to 100 parts by weight of solid:

| | |
|---|---|
| 0.05 phr | 2,2-methylene-bis(4-methyl-6-cyclohexylphenol) (Vulkanox ® ZKF from Bayer AG) |
| 0.22 phr | di-t-butyl-p-cresol (Vulkanox ® KB from Bayer AG) |
| 0.38 phr | di-laurylthiodipropionate (PS 800 from Ciba Geigy AG). |

To precipitate 5.035 kg of a 19.86% hydroxyl group-modified SBR gel latex, 6000 g water, 795.6 g common salt and 425 g precipitating agent (Superfloc® C567 (1%) from American Cyanamide Corporation) were prepared.

The prepared precipitating agent was heated to 60° C. and the pH adjusted to a value of 4 using 10 wt. % sulfuric acid. The modified latex was added to the precipitating agent while retaining this pH value. After adding the latex, the mixture was heated to 60° C. and then cooled to approx. 30° C. by the addition of cold water. The rubber gel precipitated during this process was rinsed repeatedly and after filtration was dried to constant weight at 70° C. in vacuo (approx. 60 hours).

The gel obtained (2) had a gel content of 97 wt. %, whereby the swelling index of the gelled content was 5.9. The OH value of the gel obtained (A) was 9 mg KOH per gram of rubber gel and the glass transition temperature $T_g$ was −19° C.

TABLE 1

| Gel | Gel type | Styrene content [wt. %] | DCP qty [phr] | Diam. $d_{50}$ [nm] | Gel content [%] | Ql | Tg [° C.] | Density of latex particles [g/cm³] | HEMA* [phr] |
|---|---|---|---|---|---|---|---|---|---|
| (1) | SBR | 23 | 1.5 | 56 | 98 | 4.9 | −22.5 | 0.9819 | — |
| (2) | SBR | 23 | 1.5 | 57 | 97 | 5.9 | −19 | 0.987 | 3 |

*Hydroxyethyl methacrylate

Preparation of Rubber Compounds, Vulcanization Thereof and the Measured Physical Values of the Vulcanizates The following compound variations were performed in order to demonstrate the effects according to the present invention:

TABLE 2

| Compound series | SBR gel | Multifunctional isocyanates | Polyol components |
|---|---|---|---|
| A) | Gel (2) (hydroxyl-modified with HEMA) | Isocyanurate based on hexamethylene diisocyanate | 1,4-bis(β-hydroxyethoxy)benzene |
| B) | Gel (1) (unmodified) | Crude diphenylmethane diisocyanate (MDI) consisting of approx. 50% MDI and approx. 50% polymerized MDI | 1,4-bis(β-hydroxyethoxy)benzene Polyethylene glycol (MW: 300 g/mol) Polyethylene glycol (MW: 300 g/mol) |
| C) | Gel (1) (unmodified) | Isocyanurate based on isophorone diisocyanate | 1,4-bis(β-hydroxyethoxy)benzene |

Compound Series A)

The compound components listed in the table below (quantities in phr) were mixed together by conventional means on a laboratory roll.

TABLE 3

| Compound no.: | 1 | 2 | 3 |
|---|---|---|---|
| Masticated natural rubber[1] | 100 | 100 | 100 |
| Hydroxyl-modified SBR gel (2) | 30 | 30 | 30 |
| Stearic acid | 3.0 | 3.0 | 3.0 |
| Zinc oxide | 3.0 | 3.0 | 3.0 |
| Anti-ozonant wax[2] | 1.5 | 1.5 | 1.5 |
| IPPD[3] | 1.0 | 1.0 | 1.0 |
| TMQ[4] | 1.0 | 1.0 | 1.0 |
| Mineral oil plasticizer[5] | 3.0 | 3.0 | 3.0 |
| Sulfur | 1.6 | 1.6 | 1.6 |
| Diol component: 1,4-bis(hydroxyethoxy)benzene[6] | — | — | 5 |
| TBBS accelerator[7] | 2 | 2 | 2 |
| Multifunctional isocyanate[8] | — | 10 | 10 |

[1]TSR 5, Defo 700
[2]Mixture of paraffins and microwaxes (Antilux ® 654 from Rheinchemie Rheinau GmbH)
[3]N-isopropyl-N'-phenyl-p-phenylene diamine (Vulkanox ® 4010 NA from Bayer AG)
[4]2,2,4-trimethyl-1,2-dihydroquinoline (polym.) (Vulkanox ® HS from Bayer AG)
[5]Enerthene ® 1849-1 from BP Oil GmbH
[6]Vernetzer 3010 ® from Rheinchemie
[7]N-tert.butyl-2-benzothiazyl sulfenamide (Vulkacit NZ ® from Bayer AG)
[8]Desmodur ® N 3300 from Bayer AG The vulcanization behavior of the compounds is examined in a rheometer at 160° C. in accordance with DIN 53 529 using a Monsanto MDR 2000E rheometer. Characteristic data such as $F_a$, $F_{max}$, $F_{max}-F_a$, $t_{10}$, $t_{80}$ and $t_{90}$ were determined in this way.

TABLE 4

| Compound no.: | 1 | 2 | 3 |
|---|---|---|---|
| $F_a$ [dNM] | 0.55 | 1.97 | 1.45 |
| $F_{max}$ [dNM] | 10.87 | 10.83 | 11.27 |
| $F_{max} - F_a$ [dNM] | 10.32 | 8.86 | 9.82 |
| $t_{10}$ [min] | 5.23 | 3.74 | 3.09 |
| $t_{80}$ [min] | 7.48 | 6.14 | 5.42 |
| $t_{90}$ [min] | 9.17 | 7.11 | 6.40 |

According to DIN 53 529, Part 3:

| | |
|---|---|
| $F_a =$ | Vulcameter display as minimum of crosslinking isotherms |
| $F_{max} =$ | Maximum of vulcameter display |
| $F_{max} - F_a =$ | Difference in vulcameter displays between maximum and minimum |
| $t_{10} =$ | Time at which 10% of conversion is achieved |
| $t_{80} =$ | Time at which 80% of conversion is achieved |
| $t_{90} =$ | Time at which 90% of conversion is achieved |

The compounds are vulcanized in the press at 160° C., whereby the following vulcanization times were chosen:

TABLE 5

| Compound no.: | 1 | 2 | 3 |
|---|---|---|---|
| Vulcanization time [min] | 17 | 17 | 17 |

The following vulcanizate properties were determined:

TABLE 6

| Compound no.: | 1 | 2 | 3 |
|---|---|---|---|
| Tensile strength (F) [MPa] | 27.6 | 18.0 | 25.5 |
| Elongation at break (D) [%] | 660 | 355 | 530 |
| Modulus at 50% elongation ($S_{50}$) [MPa] | 0.9 | 1.3 | 1.5 |
| Modulus at 100% elongation ($S_{100}$) [MPa] | 1.3 | 2.3 | 2.5 |
| Modulus at 300% elongation ($S_{300}$) [MPa] | 4.5 | 13.1 | 9.5 |
| Shore-A hardness, 23° C. | 54 | 62 | 64 |
| Shore-A hardness, 70° C. | 48 | 56 | 52 |
| Impact resilience at 23° C. ($E_{23}$) [%] | 47 | 56 | 38 |
| Impact resilience at 70° C. ($E_{70}$) [%] | 68 | 68 | 63 |
| Abrasion, grade 60 emery [mm³] | 106 | 80 | 111 |
| $E_{70} - E_{23}$ | 21 | 12 | 25 |
| $S_{300} \times D$ | 2970 | 4650 | 5035 |

Result:

It is demonstrated in compound series A) that the vulcanizate properties ($S_{300} \times D$) of a rubber compound containing a hydroxyl-modified SBR gel are improved by the addition of a trimerized hexamethylene diisocyanate (Desmodur® N 3300) while the difference in resilience values ($E_{70}-E_{23}$) deteriorates. The addition of 1,4-bis(β-hydroxyethoxy)benzene (Vernetzer 30/10) to the isocyanate-containing compound improves both the product $S_{300} \times D$ and the difference in resilience values ($E_{70}-E_{23}$).

Compound Series B)

TABLE 7

| Compound no.: | 1 | 2 | 3 | 4 |
|---|---|---|---|---|
| Masticated natural rubber[1] | 60 | 60 | 60 | 60 |
| SBR gel (1) (50% masterbatch in NR) | 80 | 80 | 80 | 80 |
| Stearic acid | 3.0 | 3.0 | 3.0 | 3.0 |
| Zinc oxide | 3.0 | 3.0 | 3.0 | 3.0 |
| Anti-ozonant wax[2] | 1.5 | 1.5 | 1.5 | 1.5 |
| IPPD[3] | 1.0 | 1.0 | 1.0 | 1.0 |
| TMQ[4] | 1.0 | 1.0 | 1.0 | 1.0 |
| Mineral oil plasticizer[5] | 3.0 | 3.0 | 3.0 | 3.0 |
| Sulfur | 1.6 | 1.6 | 1.6 | 1.6 |
| TBBS accelerator[6] | 2 | 2 | 2 | 2 |
| Multifunctional isocyanate based on MDI[7] | 10 | 10 | 10 | 10 |
| 1,4-bis(β-hydroxyethoxy)benzene[8] | — | 3 | — | — |
| PEG 300[9] | — | — | 5 | — |
| PEG 400[10] | — | — | — | 5 |

[1]TSR 5, Defo 700
[2]Mixture of paraffins and microwaxes (Antilux ® 654 from Rheinchemie Rheinau GmbH)
[3]N-isopropyl-N'-phenyl-p-phenylene diamine (Vulkanox ® 4010 NA from Bayer AG)
[4]2,2,4-trimethyl-1,2-dihydroquinoline (polym.) (Vulkanox ® HS from Bayer AG)
[5]Enerthene ® 1849-1 from BP Oil GmbH
[6]N-tert.butyl-2-benzothiazyl sulfenamide (Vulkacit NZ ® from Bayer AG)
[7]Desmodur ® 44 V 20 LF from Bayer AG
[8]Vernetzer 30/10 ® from Rheinchemie
[9]Polyethylene glycol with an average molecular weight of 285 to 315 g/mol (Merck)
[10]Polyethylene glycol with an average molecular weight of 380 to 420 g/mol (Merck)

The vulcanization behavior of the compounds is examined in a rheometer at 160° C. in accordance with DIN 53 529 using a Monsanto MDR 2000E rheometer. Characteristic data such as $F_a$, $F_{max}$, $F_{max}-F_a$, $t_{10}$, $t_{80}$ and $t_{90}$ were determined in this way.

TABLE 8

| Compound no.: | 1 | 2 | 3 | 4 |
|---|---|---|---|---|
| $F_a$ [dNM] | 2.6 | 2.0 | 1.0 | 1.3 |
| $F_{max}$ [dNM] | 10.7 | 10.0 | 10.3 | 10.2 |
| $F_{max} - F_a$ [dNM] | 8.1 | 8.0 | 9.3 | 8.9 |
| $t_{10}$ [min] | 10.3 | 8.9 | 5.3 | 5.4 |
| $t_{80}$ [min] | 15.5 | 12.4 | 8.7 | 8.8 |
| $t_{90}$ [min] | 17.2 | 13.9 | 10.0 | 10.0 |

According to DIN 53 529, Part 3:

$F_a$ = Vulcameter display as minimum of crosslinking isotherms $F_{max}$ = Maximum of vulcameter display $F_{max} - F_a$ = Difference in vulcameter displays between maximum and minimum $t_{10}$ = Time at which 10% of conversion is achieved $t_{80}$ = Time at which 80% of conversion is achieved $t_{90}$ = Time at which 90% of conversion is achieved The compounds are vulcanized in the press at 160° C., whereby the following vulcanization times were chosen:

TABLE 9

| Compound no.: | 1 | 2 | 3 | 4 |
|---|---|---|---|---|
| Vulcanization time [min] | 28 | 28 | 19 | 19 |

The following vulcanizate properties were determined:

TABLE 10

| Compound no.: | 1 | 2 | 3 | 4 |
|---|---|---|---|---|
| Tensile strength (F) [MPa] | 25.0 | 27.2 | 26.8 | 25.3 |
| Elongation at break (D) [%] | 497 | 540 | 535 | 510 |
| Modulus at 50% elongation ($S_{50}$) [MPa] | 1.0 | 1.0 | 1.1 | 1.0 |
| Modulus at 100% elongation ($S_{100}$) [MPa] | 1.7 | 1.6 | 1.7 | 1.6 |
| Modulus at 300% elongation ($S_{300}$) [MPa] | 8.6 | 8.2 | 8.5 | 8.7 |
| Shore-A hardness, 23° C. | 57 | 56 | 56 | 56 |
| Shore-A hardness, 70° C. | 52 | 50 | 50 | 51 |
| Impact resilience at 23° C. ($E_{23}$) [%] | 49 | 48 | 46 | 48 |
| Impact resilience at 70° C. ($E_{70}$) [%] | 66 | 66 | 64 | 67 |
| Abrasion, grade 60 emery [mm³] | 99 | 105 | 118 | 115 |
| $E_{70} - E_{23}$ | 17 | 18 | 18 | 19 |
| $S_{300} \times D$ | 4274 | 4428 | 4548 | 4437 |

Result:

It is demonstrated in compound series B) that both the vulcanizate properties ($S_{300} \times D$) and the difference in resilience values ($E_{70}-E_{23}$) of rubber compounds containing unmodified SBR gels and multifunctional isocyanates (in this case: crude MDI) are improved by additions of 3 phr Vernetzer 30/10, 5 phr polyethylene glycol with a molecular weight of 300 g/mol or 5 phr polyethylene glycol with a molecular weight of 400 g/mol.

Compound Series C)

TABLE 11

| Compound no.: | 1 | 2 | 3 |
|---|---|---|---|
| Masticated natural rubber[1] | 60 | 60 | 60 |
| SBR gel (1) (50% masterbatch in NR) | 80 | 80 | 80 |
| Stearic acid | 3.0 | 3.0 | 3.0 |
| Zinc oxide | 3.0 | 3.0 | 3.0 |
| Anti-ozonant wax[2] | 1.5 | 1.5 | 1.5 |
| IPPD[3] | 1.0 | 1.0 | 1.0 |
| TMQ[4] | 1.0 | 1.0 | 1.0 |
| Mineral oil plasticizer[5] | 3.0 | 3.0 | 3.0 |
| Sulfur | 1.6 | 1.6 | 1.6 |
| TBBS accelerator[6] | 2 | 2 | 2 |
| Trimerized isophorone diisocyanate[7] | 10 | 10 | 10 |
| Diol component: 1,4-bis(hydroxyethoxy)benzene[8] | — | 3 | 5 |

[1]TSR 5, Defo 700
[2]Mixture of paraffins and microwaxes (Antilux ® 654 from Rheinchemie Rheinau GmbH)
[3]N-isopropyl-N'-phenyl-p-phenylene diamine (Vulkanox ® 4010 NA from Bayer AG)
[4]2,2,4-trimethyl-1,2-dihydroquinoline (polym.) (Vulkanox ® HS from Bayer AG)
[5]Enerthene ® 1849-1 from BP Oil GmbH
[6]N-tert.butyl-2-benzothiazyl sulfenamide (Vulkacit NZ ® from Bayer AG)
[7]Desmodur ® Z 4300 from Bayer AG
[8]Vernetzer 30/10 ® from Rheinchemie The vulcanization behavior of the compounds is examined in a rheometer at 160° C. in accordance with DIN 53 529 using a Monsanto MDR 2000E rheometer. Characteristic data such as $F_a$, $F_{max}$, $F_{max}-F_a$, $t_{10}$, $t_{80}$ and $t_{90}$ were determined in this way.

TABLE 12

| Compound no.: | 1 | 2 | 3 |
|---|---|---|---|
| $F_a$ [dNM] | 1.8 | 1.3 | 1.1 |
| $F_{max}$ [dNM] | 12.9 | 11.6 | 10.0 |
| $F_{max} - F_a$ [dNM] | 11.1 | 10.3 | 8.9 |
| $t_{10}$ [min] | 4.0 | 5.2 | 5.2 |
| $t_{80}$ [min] | 11.8 | 10.8 | 9.2 |
| $t_{90}$ [min] | 14.1 | 13.1 | 11.3 |

According to DIN 53 529, Part 3:

$F_a$ = Vulcameter display as minimum of crosslinking isotherms $F_{max}$ = Maximum of vulcameter display $F_{max} - F_a$ = Difference in vulcameter displays between maximum and minimum $t_{10}$ = Time at which 10% of conversion is achieved $t_{80}$ = Time at which 80% of conversion is achieved $t_{90}$ = Time at which 90% of conversion is achieved The compounds are vulcanized in the press at 160° C., whereby the following vulcanization times were chosen:

TABLE 13

| Compound no.: | 1 | 2 | 3 |
|---|---|---|---|
| Vulcanization time [min] | 28 | 28 | 28 |

The following vulcanizate properties were determined:

TABLE 14

| Compound no.: | 1 | 2 | 3 |
|---|---|---|---|
| Tensile strength (F) [MPa] | 23.9 | 22.3 | 22.0 |
| Elongation at break (D) [%] | 531 | 487 | 494 |
| Modulus at 50% elongation ($S_{50}$) [MPa] | 1.4 | 2.2 | 2.0 |
| Modulus at 100% elongation ($S_{100}$) [MPa] | 2.3 | 3.2 | 3.0 |
| Modulus at 300% elongation ($S_{300}$) [MPa] | 8.6 | 9.6 | 9.3 |
| Shore-A hardness, 23° C. | 62 | 63 | 63 |
| Shore-A hardness, 70° C. | 57 | 56 | 56 |
| Impact resilience at 23° C. ($E_{23}$) [%] | 44 | 42 | 42 |
| Impact resilience at 70° C. ($E_{70}$) [%] | 62 | 61 | 60 |
| Abrasion, grade 60 emery [mm$^3$] | 112 | 133 | 131 |
| $E_{70} - E_{23}$ | 18 | 19 | 18 |
| $S_{300} \times D$ | 4567 | 4675 | 4594 |

Result:

It is demonstrated in compound series C) that the vulcanizate properties ($S_{300} \times D$) of a rubber compound containing an unmodified SBR gel and a trimerized isophorone diisocyanate (Desmodur® Z 4300) are improved by additions of varying quantities of 1,4-bis(β-hydroxyethoxy)benzene (Vernetzer 30/10) with no deterioration in the difference in resilience values ($E_{70}-E_{23}$).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Rubber compounds consisting of uncrosslinked rubbers (A), crosslinked rubber particles (B), multifunctional isocyanates (C) and polyols (D), wherein, relative in each case to 100 parts by weight (phr) of the rubber components (A), the content of said crosslinked rubber particles (B) is 1 to 150 parts by weight, the content of said multifunctional isocyanates (C) is 1 to 100 parts by weight, and the content of said polyols (D) is 1 to 50 parts by weight, wherein component (A) is selected from the group consisting of NR, IR, IS, SBR, BR, NBR, IIR, BIIR, CIIR, HNBR, SNBR, SIBR, CR, ENR, X-NBR, X-SBR, EAM, EVM, CO, CEO, Q, AU, EU and mixtures thereof and wherein component D is selected from the group consisting of polyester polyols, polyether polyols, polycarbonate polyols and mixtures thereof.

2. Rubber compounds according to claim 1, wherein 5 to 100 parts by weight of said crosslinked rubber particles (B), 3 to 50 parts by weight of said multifunctional isocyanates (C) and 1 to 30 parts by weight of said polyols (D) are present in the rubber compound, relative in each case to 100 parts by weight of rubber component (A).

3. Rubber compounds according to claim 1, wherein said crosslinked rubber particles (B) comprise particle diameters of 5 to 1000 nm and swelling indices in toluene of 1 to 15.

4. Molded rubber articles containing rubber compounds which consist of uncrosslinked rubbers (A), crosslinked rubber particles (B), multifunctional isocyanates (C) and polyols (D), wherein, relative in each case to 100 parts by weight (phr) of the rubber components (A), the content of said crosslinked rubber particles (B) is 1 to 150 parts by weight, the content of said multifunctional isocyanates (C) is 1 to 100 parts by weight, and the content of said polyols (D) is 1 to 50 parts by weight, wherein component (A) is selected from the group consisting of NR, IR, IS, SBR, BR, NBR, IIR, BIIR, CIIR, HNBR, SNBR, SIBR, CR, ENR, X-NBR, X-SBR, EAM, EVM, CO, CEO, Q, AU, EU and mixtures thereof and wherein component D is selected from the group consisting of polyester polyols, polyether polyols, polycarbonate polyols and mixtures thereof.

5. A molded rubber article according to claim 4, wherein said molded rubber article is selected from the group consisting of cable sheaths, tubes, drive belts, conveyor belts, roll coverings, tires and tire components, shoe soles, sealing rings, damping elements and membranes.

* * * * *